US009669842B2

(12) United States Patent
Matsumoto et al.

(10) Patent No.: US 9,669,842 B2
(45) Date of Patent: Jun. 6, 2017

(54) CONTROL APPARATUS

(71) Applicant: DENSO CORPORATION, Kariya, Aichi-pref. (JP)

(72) Inventors: Masato Matsumoto, Kosai (JP); Kenji Mutou, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/788,040

(22) Filed: Jun. 30, 2015

(65) Prior Publication Data
US 2016/0004254 A1    Jan. 7, 2016

(30) Foreign Application Priority Data

Jul. 1, 2014    (JP) .................................. 2014-135985

(51) Int. Cl.
*B60W 50/04*    (2006.01)
*G05D 1/00*    (2006.01)

(52) U.S. Cl.
CPC ......... *B60W 50/045* (2013.01); *G05D 1/0077* (2013.01); *B60W 2050/046* (2013.01); *G05D 2201/0213* (2013.01)

(58) Field of Classification Search
CPC ........................... B60W 50/045; G05D 1/0077
See application file for complete search history.

(56) References Cited

U.S. PATENT DOCUMENTS 5,861,842 A * 1/1999 Hitch ....................... G04G 7/02
                                                                    342/352
8,645,022 B2 * 2/2014 Yoshimura ............... B60K 6/46
                                                                    701/31.4
9,079,662 B1 * 7/2015 Duffy ...................... B64C 37/02
(Continued)

FOREIGN PATENT DOCUMENTS

JP    2003-308594    10/2003
JP    2007-233965    9/2007
(Continued)

OTHER PUBLICATIONS

JP2003-308594 English machine translation, all pages, retrieved from JPO wehsite.*
(Continued)

*Primary Examiner* — Calvin Cheung
(74) *Attorney, Agent, or Firm* — Knobbe, Martens, Olson & Bear, LLP

(57)    ABSTRACT

A control apparatus is used in a vehicle that performs automatic travel control. The apparatus includes a search section which searches for an external unit, when information used for the automatic travel control is no longer available due to abnormality, the external unit providing assist information for complementing missing information that is the information no longer available due to the abnormality, an acquisition section which acquires the assist information from the external unit obtained as a result of the search of the search section, and a processing section which
(Continued)

performs a process for performing assist travel control, which is the automatic travel control as a result of complementing the missing information with the assist information.

20 Claims, 17 Drawing Sheets

(56) References Cited

U.S. PATENT DOCUMENTS

| | | | | |
|---|---|---|---|---|
| 2002/0099487 A1* | 7/2002 | Suganuma | ......... | B60R 16/0232 701/48 |
| 2003/0009271 A1* | 1/2003 | Akiyama | ............. | G06F 21/335 701/29.6 |
| 2004/0162670 A1* | 8/2004 | Brown | ................ | G05D 1/0061 701/110 |
| 2007/0040705 A1* | 2/2007 | Yoshioka | ............ | G08G 1/0969 340/988 |
| 2009/0292431 A1* | 11/2009 | Hoshino | ................ | F16H 61/12 701/62 |
| 2010/0036595 A1* | 2/2010 | Coy | ..................... | G08G 1/0104 701/119 |
| 2011/0010022 A1* | 1/2011 | Beavin | ................ | G05D 1/0044 701/2 |
| 2012/0271499 A1* | 10/2012 | Inoue | ....................... | B60T 7/12 701/23 |
| 2013/0268186 A1* | 10/2013 | Yamashiro | ............. | G06F 17/00 701/300 |
| 2013/0304279 A1* | 11/2013 | Mudalige | .............. | G08G 1/164 701/2 |
| 2014/0074339 A1* | 3/2014 | Casado | ................ | G05D 1/0088 701/24 |
| 2015/0009331 A1* | 1/2015 | Venkatraman | ........ | B61L 23/042 348/148 |
| 2015/0023668 A1* | 1/2015 | Spaulding | .......... | H04B 10/1129 398/106 |
| 2015/0195827 A1* | 7/2015 | Feng | ..................... | H04W 4/206 380/270 |
| 2015/0331422 A1* | 11/2015 | Hartung | ................. | G05D 1/021 701/23 |
| 2016/0071418 A1* | 3/2016 | Oshida | ..................... | G08G 1/22 701/23 |
| 2016/0121890 A1* | 5/2016 | Han | ...................... | B60W 30/16 701/93 |
| 2016/0231746 A1* | 8/2016 | Hazelton | .............. | G05D 1/0212 |
| 2016/0236683 A1* | 8/2016 | Eggert | ................... | G01C 21/20 |
| 2016/0260328 A1* | 9/2016 | Mishra | ................... | G08G 1/163 |
| 2016/0357192 A1* | 12/2016 | McGrew | ................ | B64D 47/08 |

FOREIGN PATENT DOCUMENTS

| | | | | |
|---|---|---|---|---|
| JP | 2009-61940 | * | 3/2009 | ........... B60W 30/14 |
| JP | 2011-240816 | | 12/2011 | |

OTHER PUBLICATIONS

JP2007-233965 English machine translation, all pages, retrieved from JPO wehsite.*

JP2011-240816 English machine translation, all pages, retrieved from JPO wehsite.*

JP2009-061940 English machine translation, all pages, retrieved from JPO wehsite.*

* cited by examiner

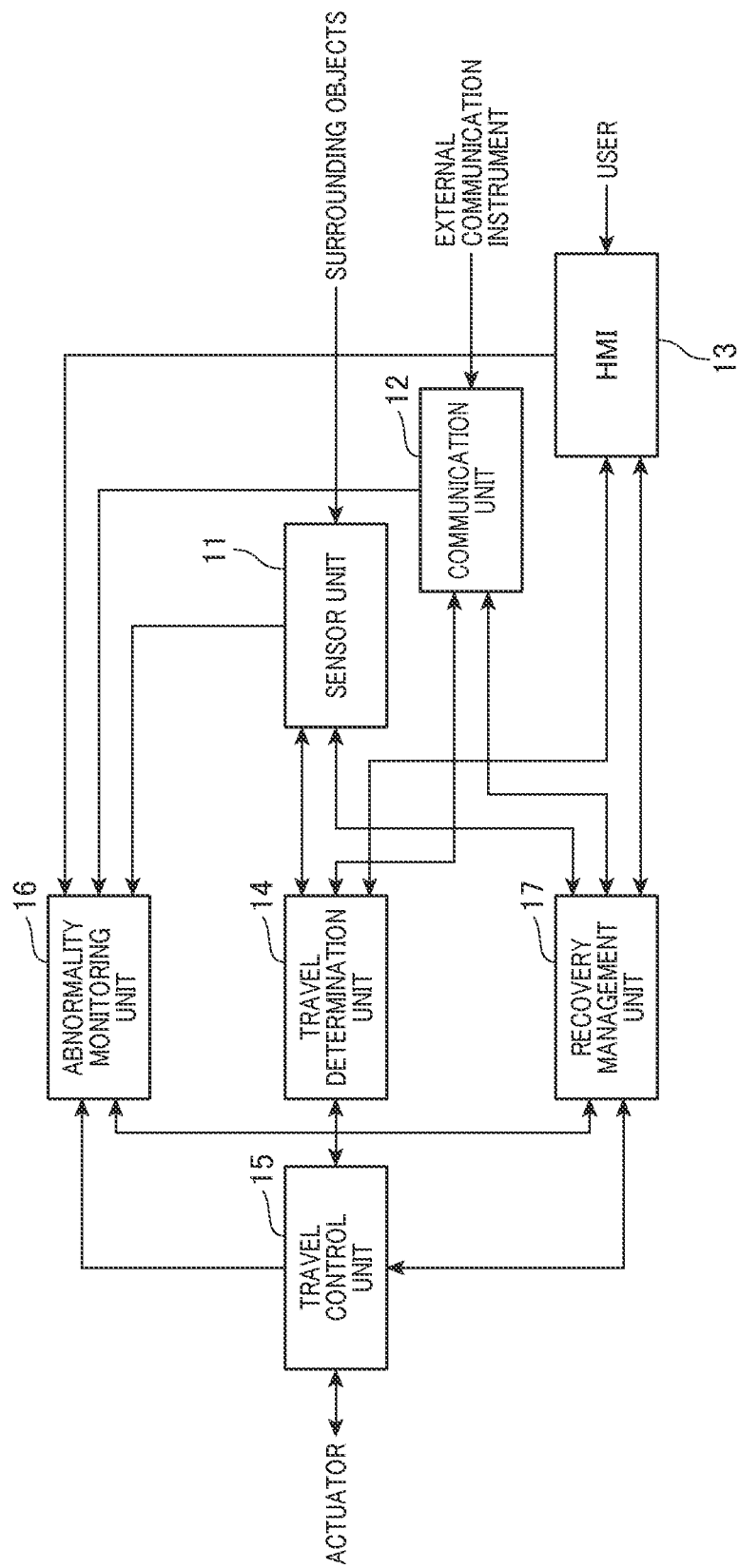

FIG. 2

NORMAL STATE

| FUNCTION | STATE |
|---|---|
| MOBILE WIRELESS COMMUNICATION FUNCTION | NORMAL |
| Wi-Fi WIRELESS COMMUNICATION FUNCTION | NORMAL |
| DISTANCE MEASUREMENT FUNCTION FOR FORWARD OBJECT | NORMAL |
| ABSOLUTE POSITION MEASUREMENT FUNCTION FOR OWN VEHICLE | NORMAL |
| WHITE LINE RECOGNITION FUNCTION | NORMAL |
| SIGN RECOGNITION FUNCTION | NORMAL |
| ... | ... |
| REAR RECOGNITION FUNCTION | NORMAL |

OCCURRENCE OF FAILURE →

ABNORMAL STATE (STOPPED STATE)

| FUNCTION | STATE |
|---|---|
| MOBILE WIRELESS COMMUNICATION FUNCTION | NORMAL |
| Wi-Fi WIRELESS COMMUNICATION FUNCTION | NORMAL |
| DISTANCE MEASUREMENT FUNCTION FOR FORWARD OBJECT | ABNORMAL |
| ABSOLUTE POSITION MEASUREMENT FUNCTION FOR OWN VEHICLE | NORMAL |
| WHITE LINE RECOGNITION FUNCTION | ABNORMAL |
| SIGN RECOGNITION FUNCTION | NORMAL |
| ... | ... |
| REAR RECOGNITION FUNCTION | NORMAL |

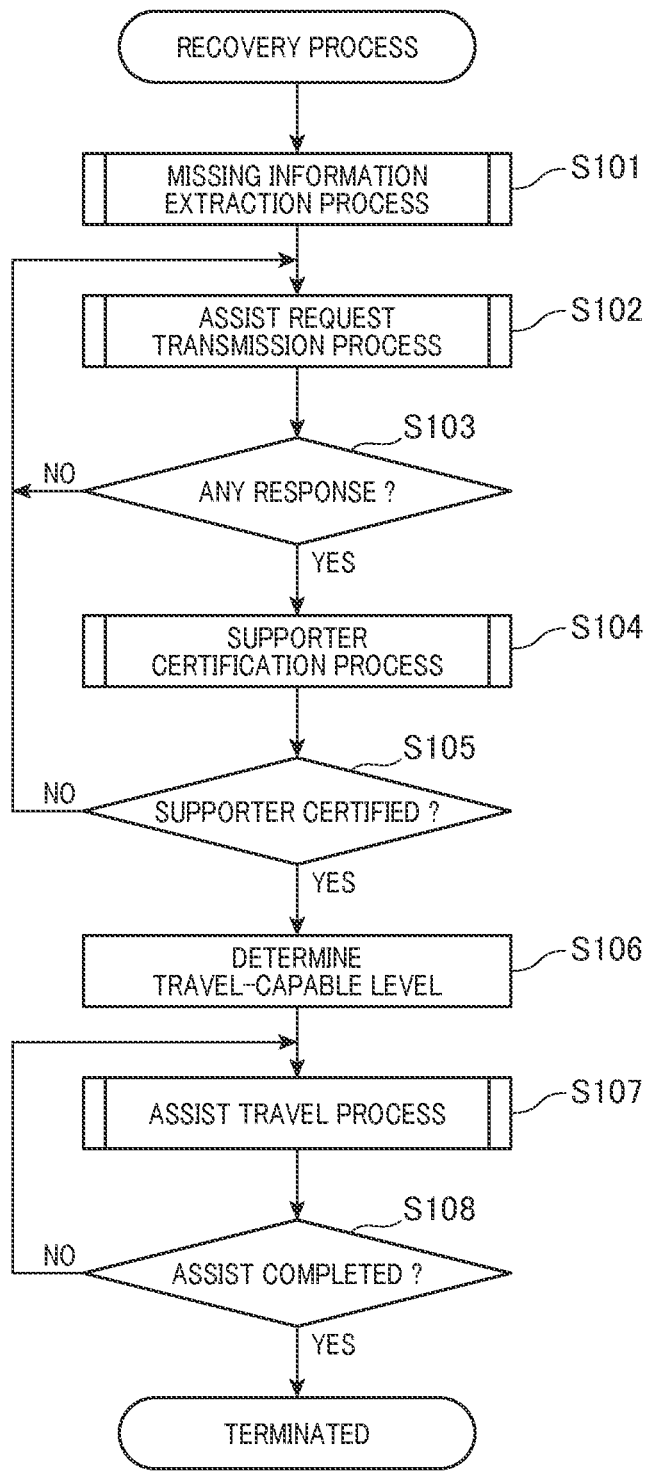

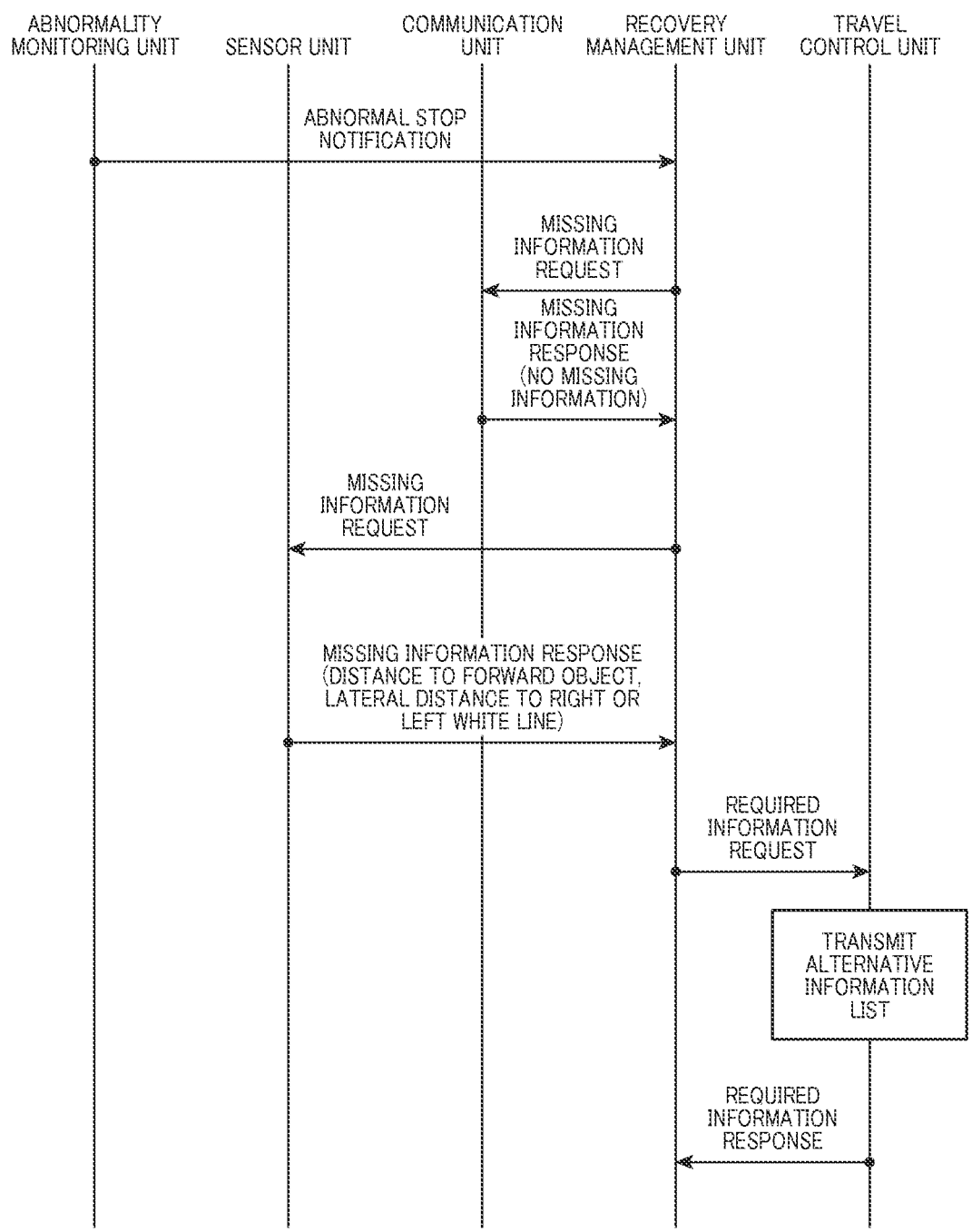

FIG. 6A

DISTANCE TO (AZIMUTH OF) FORWARD OBJECT (MUST CONDITIONS)

| TYPE OF INFORMATION | PRIORITY DEGREE | ACCURACY DEGREE | TRAVEL-CAPABLE CONDITION (MAXIMUM SPEED) | CONDITION |
|---|---|---|---|---|
| DISTANCE TO (AZIMUTH OF) FORWARD OBJECT | 1 | 5cm(0.1 DEGREE) | 90km/h | NULL |
| | | 10cm(0.2 DEGREE) | 60km/h | |
| | | 50cm(1.0 DEGREE) | 30km/h | |
| POSITION OF FORWARD OBJECT | 2 | 10cm | 60km/h | POSITION MEASUREMENT OF OWN VEHICLE ENABLED |
| | | 50cm | 20km/h | |

FIG. 6B

LATERAL DISTANCE TO RIGHT OR LEFT WHITE LINE (WANT CONDITIONS)

| TYPE OF INFORMATION | PRIORITY DEGREE | ACCURACY DEGREE | TRAVEL-CAPABLE CONDITION (MAXIMUM SPEED) | CONDITION |
|---|---|---|---|---|
| LATERAL DISTANCE | 1 | 5cm | 90km/h | NULL |
| | NULL | NULL | 20km/h | NULL |

FIG. 7

REQUIRED INFORMATION LIST

| PRIORITY DEGREE | DISTANCE TO FORWARD OBJECT | | POSITION OF FORWARD OBJECT | | LATERAL DISTANCE TO RIGHT OR LEFT WHITE LINE | | TRAVEL-CAPABLE CONDITION (MAXIMUM SPEED) |
|---|---|---|---|---|---|---|---|
| | AVAILABLE/ UNAVAILABLE | ACCURACY DEGREE | AVAILABLE/ UNAVAILABLE | ACCURACY DEGREE | AVAILABLE/ UNAVAILABLE | ACCURACY DEGREE | |
| 1 | AVAILABLE | 5cm | UNAVAILABLE | — | AVAILABLE | 5cm | 90km/h |
| 2 | AVAILABLE | 10cm | UNAVAILABLE | — | AVAILABLE | 5cm | 60km/h |
| 3 | UNAVAILABLE | — | AVAILABLE | 10cm | AVAILABLE | 5cm | 60km/h |
| 4 | AVAILABLE | 50cm | UNAVAILABLE | — | AVAILABLE | 5cm | 30km/h |
| 5 | UNAVAILABLE | — | AVAILABLE | 50cm | AVAILABLE | 5cm | 30km/h |
| 6 | AVAILABLE | 5cm | UNAVAILABLE | — | UNAVAILABLE | — | 30km/h |
| 7 | AVAILABLE | 10cm | UNAVAILABLE | — | UNAVAILABLE | — | 20km/h |
| 8 | UNAVAILABLE | — | AVAILABLE | 10cm | UNAVAILABLE | — | 20km/h |
| 9 | AVAILABLE | 50cm | UNAVAILABLE | — | UNAVAILABLE | — | 20km/h |
| 10 | UNAVAILABLE | — | AVAILABLE | 50cm | UNAVAILABLE | — | 20km/h |

CONTROL APPARATUS

CROSS-REFERENCE TO RELATED APPLICATION

This application is based on and claims the benefit of priority from earlier Japanese Patent Application No. 2014-135985 filed Jul. 1, 2014, the description of which is incorporated herein by reference.

BACKGROUND

Technical Field

The present invention relates to automatic travel control for a vehicle.

Related Art

With improvement of automatic cruising techniques, lane keeping techniques, or the like, a technique for having a vehicle automatically travel without requiring a driver's intervention is proceeding toward practical use. In such automatic travel control, safety is required to be more enhanced in preparation for the occurrence of any abnormality.

JP-A-2011-240816 discloses a configuration for emergency stopping of a vehicle when it is determined that the vehicle is required to be immediately stopped due to the occurrence of abnormality. In this case, the vehicle is stopped according to a control principle which is uniquely determined on the basis of the usable parts, which are specific parts other than the part suffering from abnormality, and on the basis of a preset emergency stop mode.

However, taking account of the possible proliferation of completely automatic travel control that is not in need of a licensed driver, some countermeasures are required to be taken against the case, for example, where the occupants are those who are not able to drive the vehicle, such as aged persons or disabled persons. In such a case, only the emergency stop of the vehicle is not sufficient for ensuring safety, but the vehicle has to be safely moved to a place, such as outside the road.

SUMMARY

An embodiment provides a technique for easily and safely moving a vehicle in the occurrence of abnormality during automatic travel control.

As an aspect of the embodiment, a control apparatus is used in a vehicle that performs automatic travel control. The apparatus includes: a search section which searches for an external unit, when information used for the automatic travel control is no longer available due to abnormality, the external unit providing assist information for complementing missing information that is the information no longer available due to the abnormality; an acquisition section which acquires the assist information from the external unit obtained as a result of the search of the search section; and a processing section which performs a process for performing assist travel control, which is the automatic travel control as a result of complementing the missing information with the assist information.

BRIEF DESCRIPTION OF THE DRAWINGS

In the accompanying drawings:

FIG. 1 is a block diagram illustrating a configuration of an automated travel system;

FIG. 2 is a diagram illustrating state change of functions used for automatic travel control;

FIG. 3 is a flow diagram illustrating a recovery process, according to a first embodiment;

FIG. 5 is a time diagram illustrating the missing information extraction process, according to the first embodiment;

FIG. 6A is a diagram illustrating an alternative information list regarding distance to an object in the forward direction;

FIG. 6B is a diagram illustrating an alternative information list regarding lateral distance to the right or left white line;

FIG. 7 is a diagram illustrating a required information list;

DETAILED DESCRIPTION OF THE PREFERRED EMBODIMENTS

Figure 4:
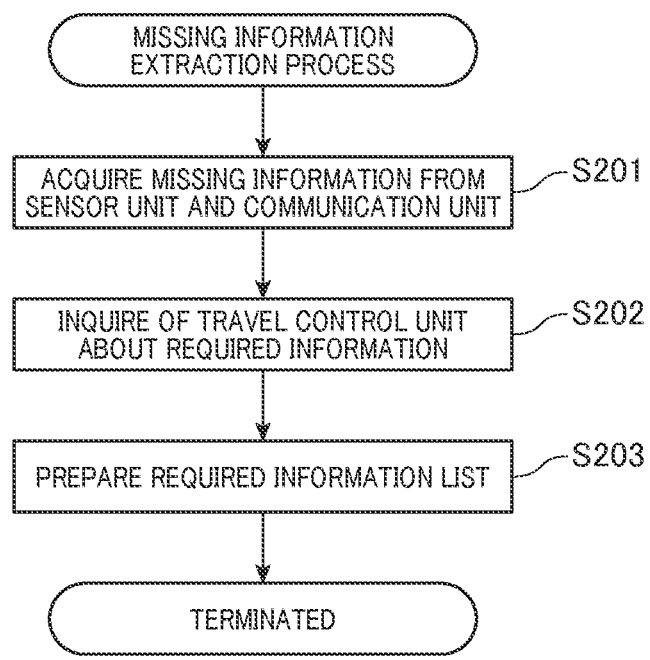
FIG. 4 is a flow diagram illustrating a missing information extraction process, according to the first embodiment.

With reference to the accompanying drawings, hereinafter are described some embodiments as examples of the present invention.

[1. First Embodiment]

[1-1. Configuration]

FIG. 1 is a block diagram illustrating a configuration of an automated travel system. The automated travel system shown in FIG. 1 is installed in a vehicle that performs automatic travel (autonomous travel) control. This vehicle is hereinafter referred to as "own vehicle". The automated travel system includes a sensor unit 11, a communication unit 12, an HMI (human machine interface) 13, a travel determination unit 14, a travel control unit 15, an abnormality monitoring unit 16, and a recovery management unit 17.

The sensor unit 11 is configured to recognize the surrounding environment, such as objects that are present around the own vehicle (e.g., other vehicles or pedestrians). The sensor unit 11 includes a radar, for example, to realize a distance measurement function of measuring a distance to an object which is present in the forward direction of the own vehicle (forward object). The sensor unit 11 includes a position detector, such as GPS (global positioning system), to realize an absolute position measurement function of measuring an absolute position of the own vehicle. The sensor unit 11 includes an imaging unit, for example, that picks up an image ahead of the own vehicle to realize, for example, a white-line recognition function of recognizing a mark line (so-called white line) on a road, or a sign recognition function of recognizing a sign set up on a road. The sensor unit 11 includes an imaging unit, for example, that picks up an image behind the own vehicle to realize, for example, a rear recognition function of recognizing an object which is present in the rearward direction of the own vehicle (rearward object).

The communication unit 12 is configured to communicate with an external unit outside the own vehicle. The communication referred to herein can be wireless communication or wired communication, or both of wireless and wired communication. The communication unit 12 includes, for example, a mobile communication instrument for performing wireless communication via a mobile network (cellular network) to realize a mobile wireless communication function. The communication unit 12 includes, for example, a Wi-Fi communication instrument for performing Wi-Fi wireless communication to realize a Wi-Fi wireless communication function. It should be noted that, besides these communication means, the communication unit 12 may include a communication instrument for performing communication via a V2X (vehicle to X), a wired LAN (local area network), a USB (universal serial bus), or the like.

The HMI 13 includes an operation section that accepts a user's operation, and a display section that displays various pieces of information in the form of an image that can be visually recognized by a user. For example, the HMI 13 accepts an operation instructing a travel mode.

The travel determination unit 14 acquires information from the sensor unit 11, the communication unit 12 and the HMI 13, for use in automatic travel control. The travel determination unit 14 calculates a control variable for use in automatic travel control on the basis of the acquired information and outputs the calculated control variable to the travel control unit 15.

The travel control unit 15 acquires the control variable from the travel determination unit 14 and, based on the control variable, controls actuators that are mounted to the own vehicle to realize control over the engine, the brake, the steering wheel, and the like. In this way, automatic driving (automatic travel) of the own vehicle is realized.

The abnormality monitoring unit 16 acquires information from the sensor unit 11, the communication unit 12 and the HMI 13, for use in automatic travel control. The abnormality monitoring unit 16 monitors the states of the various functions of the sensor unit 11 and the communication unit 12 mentioned above, on the basis of the information acquired from the sensor unit 11 and the communication unit 12. The various functions mentioned above are used for the automatic travel control. The abnormality monitoring unit 16 outputs an abnormal-stop notification to the abnormality monitoring unit 16 when, as shown in FIG. 2, the occurrence of a failure (abnormality) is detected at least in one function during automatic travel control. In other words, the own vehicle is configured to stop travel in the event that abnormality is detected during automatic travel control, the abnormality being that information for use in the automatic travel control can no longer be obtained.

Upon reception of the abnormal-stop notification from the abnormality monitoring unit 16, the recovery management unit 17 performs processing on behalf of the travel determination unit 14. Specifically, the recovery management unit 17 calculates a control variable so as to stop the own vehicle and outputs the calculated control variable to the travel control unit 15. After that, the recovery management unit 17 performs a recovery process described later. In the recovery process, the recovery management unit 17 performs a process of notifying the surroundings of the abnormal state. Thus, for example, the recovery management unit 17 can allow an external unit having a distance measurement function (e.g., vehicle having a distance measurement function for a rearward object) to guide and move the own vehicle to a safe place where traffic is unlikely to be interrupted.

The travel determination unit 14, the travel control unit 15, the abnormality monitoring unit 16 and the recovery management unit 17 are each configured by an electronic control unit that includes a CPU, a ROM, a RAM and the like. For example, the travel determination unit 14, the travel control unit 15, the abnormality monitoring unit 16 and the recovery management unit 17 may each be realized as a function of a separate electronic control unit. Further, for example, the travel determination unit 14, the travel control unit 15, the abnormality monitoring unit 16 and the recovery management unit 17 may be realized as functions of a common electronic control unit.

[1-2. Processing]

Referring to FIG. 3, the recovery process performed by the recovery management unit 17 is described. FIG. 3 is a flow diagram illustrating the recovery process. The recovery process is started upon output of the abnormal-stop notification from the abnormality monitoring unit 16.

First, the recovery management unit 17 performs a missing information extraction process (S101). Referring to FIGS. 4 and 5, a detailed procedure of the missing information extraction process is described.

FIG. 4 is a flow diagram illustrating the missing information extraction process, and FIG. 5 is a time diagram illustrating the missing information extraction process. As shown in FIG. 4, the recovery management unit 17 acquires, first, missing information from the sensor unit 11 and the communication unit 12 (step S201). The missing information refers to information that can no longer be obtained due to the occurrence of abnormality, among pieces of information used for automatic travel control. In the example shown in FIG. 5, a missing information request is outputted from the recovery management unit 17 to the communication unit 12 and, in response, a missing information response is outputted from the communication unit 12 to the recovery management unit 17. In the example shown in FIG. 5, no abnormality has occurred in the communication unit 12 and thus a missing information response indicative of no missing is outputted. Then, a missing information request is outputted from the recovery management unit 17 to the sensor unit 11 and, in response, a missing information response is outputted from the sensor unit 11 to the recovery management unit 17. In the example shown in FIG. 5, abnormality has occurred in the sensor unit 11 and thus the sensor unit 11 outputs a missing information response indicative of missing pieces of information, which are a distance to a forward object and a lateral distance to the right or left white line. The lateral distance to the right or left white line refers to a distance to a white line immediately lateral from the own vehicle.

Then, the recovery management unit 17 inquires of the travel control unit 15 about required information (step S202). Specifically, as shown in FIG. 5, a required information request is outputted from the recovery management unit 17 to the travel control unit 15 and, in response, a required information response is outputted from the travel control unit 15 to the recovery management unit 17. In the example shown in FIG. 5, normally used information or alternative information is requested as required information, in respect of the distance to a forward object and the lateral distance to the right or left white line. In other words, the required information includes not only missing information but also its alternative information.

For example, when a sensor such as of a radar or an imaging unit for monitoring surrounding environments suffers a failure, surrounding objects can no longer be recognized. In this case, the travel control unit 15 can no longer acquire information that can be normally acquired for use in automatic travel control. However, utilizing internal functions, there is a probability that information alternative to the unavailable information can be acquired. For example, as an alternative of the information on a distance to a preceding vehicle that would have been obtained by the radar, information on an absolute position detected by the preceding vehicle can be received from the preceding vehicle.

The travel control unit 15 outputs an alternative information list stored in advance in an internal database to the recovery management unit 17 as a required information response. As shown in FIGS. 6A and 6B, the alternative information list stored in the travel control unit 15 includes priority degree of required information, accuracy degree, travel-capable condition, and condition for using the information.

The distance to (azimuth of) a forward object indicated in FIG. 6A corresponds to a MUST condition (essential information). Accordingly, this information or alternative information (in this example, information indicating the position of a forward object) is indispensable. A distance and an azimuth, which are normally separate pieces of information, are treated herein as integrated information for the sake of simplifying description.

On the other hand, the lateral distance to the right or left white line indicated in FIG. 6B corresponds to a WANT condition (additional information). Accordingly, in the absence of this information, low-speed movement (in this example, movement at a maximum speed of 20 km/h) is enabled.

The reason why the lateral distance to the right or left white line corresponds to a WANT condition is that, in the event that the lateral distance to the right or left white line is unavailable and lane-keeping control is resultantly disabled, the vehicle can nevertheless be withdrawn to the outside of the road or can be moved such as to a nearby auto-repair garage if the movement is only transitory. However, the MUST condition and the WANT condition are only examples and thus should not be construed as being limited to these.

Then, the recovery management unit 17 prepares a required information list on the basis of the alternative information list acquired from the travel control unit 15 (step S203) and then terminates the missing information extraction process of FIG. 4. FIG. 7 is a diagram illustrating a required information list. As shown in FIG. 7, the required information list refers to a list that determines priority degree in descending order of the level of travel-capable conditions, among combinations of pieces of required information. For example, the required information is prepared as described below.

Specifically, in the combinations of pieces of required information, priority degree in the required information list is determined in descending order of the level of travel-capable conditions. The combinations of pieces of required information herein each refer to a combination of a distance to a forward object with a lateral distance to the right or left white line.

The distance to a forward object corresponds to a MUST condition. Therefore, this information or alternative information (position of the forward object) is indispensable. As to the former, the travel-capable condition (90, 60 or 30 km/h) depends on three accuracy degrees (5, 10 or 50 cm). As to the latter, the travel-capable condition (60 or 20 km/h) depends on two accuracy degrees (10 or 50 cm). Specifically, the number of options is five. On the other hand, the lateral distance to the right or left white line corresponds to a WANT condition. Therefore, this information is not essential. Specifically, the number of options is two. Accordingly, there are ten combinations between the distance to a forward object and the lateral distance to the right or left white line.

The condition of a lowest level among the relevant conditions in the alternative information list is adopted as a travel-capable condition. For example, when a distance to a forward object with an accuracy degree of 5 cm (travel-capable condition of 90 km/h) is obtained, the travel-capable condition is 20 km/h, unless a lateral distance to the right or left white line is obtained (travel-capable condition of 20 km/h).

If travel-capable conditions coincide between a plurality of combinations, priority degree in the required information list is determined in descending order of priority degree in the same information (in the alternative information list). As other criteria, priority degree may be determined in descending order of the number of MUST conditions included in the combinations. If the order cannot be determined from various criteria, the order of priority degree may be determined at random. Such a way of preparing a required information list is only an example and should not be construed as being particularly limited.

Returning to FIG. 3 again, the recovery management unit 17 performs an assist request transmission process (step S102). A detailed procedure of the assist request transmission process is described referring to FIG. 8.

Figure 8:
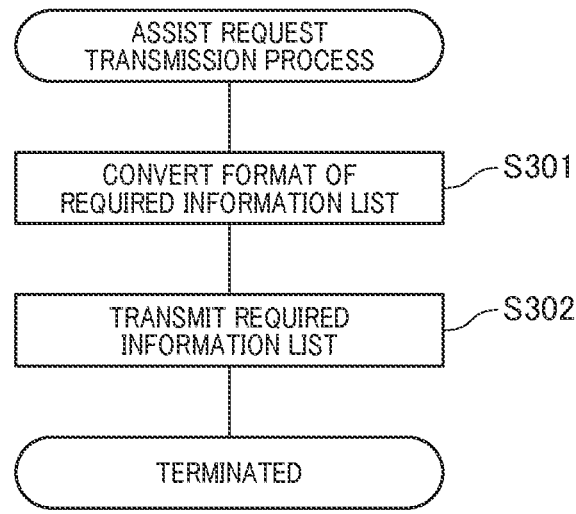
FIG. 8 is a flow diagram illustrating an assist request transmission process, according to the first embodiment.

FIG. 8 is a flow diagram illustrating the assist request transmission process. First, the recovery management unit 17 converts the format of the required information list to a format for communication (step S301). Then, the recovery management unit 17 performs a process of transmitting the required information list that has been converted to the format for communication, as an assist request, via all the communication means provided to the communication unit 12 (step S302), and then terminates the assist request transmission process of FIG. 8. The assist request is transmitted to unspecified communication units that are present around the own vehicle and therefore the request is broadcasted from all the communication means. However, this should not impose a limitation. The assist request may be ensured to be notified to specific communication units (e.g., communication units in specialized agencies). Further, a process of displaying the required information list on the HMI 13 may be performed.

Returning to FIG. 3 again, the recovery management unit 17 determines whether or not a response to the transmitted required information list has been received (step S103). If the recovery management unit 17 determines that no response has been received (NO at step S103), the process returns to step S102. In other words, the assist request transmission process is repeatedly performed until a response is received.

Figure 9:
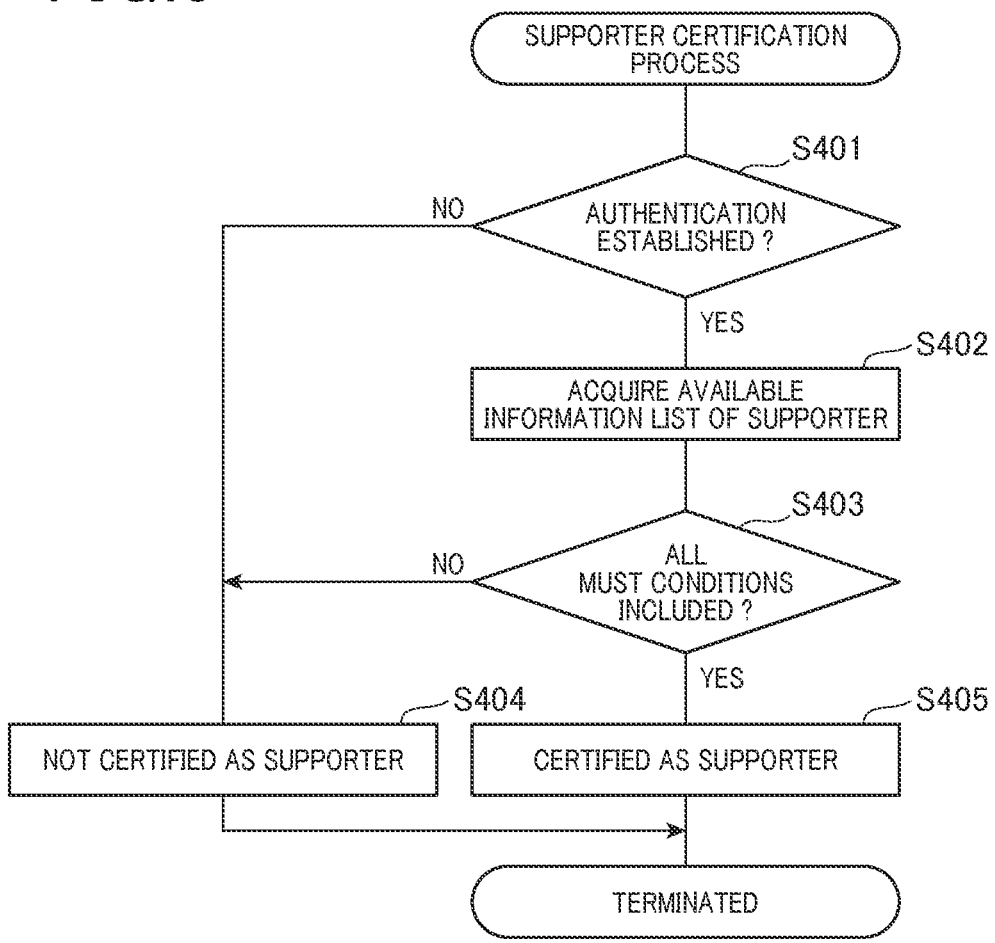
FIG. 9 is a flow diagram illustrating a supporter certification process, according to the first embodiment.

On the other hand, if the recovery management unit 17 determines that the response has been received (YES at step S103), a supporter certification process is performed (step S104). Referring to FIG. 9, a detailed procedure of the supporter certification process is described.

FIG. 9 is a flow diagram illustrating the supporter certification process. First, the recovery management unit 17 determines whether or not authentication has been established for a supporter (support unit) that is a response source (step S401). The authentication herein refers to a step of excluding those who are not proper as supporters. The method of the authentication is not particularly limited. For example, an automated drive vehicle can be an unattended vehicle. If an unspecified person were allowed to guide such an unattended vehicle, there is a concern that the vehicle might been stolen. Therefore, as a measure against this, a person or a unit may be required to be limited by being authenticated by some authority. The authentication, however, is not necessarily required to be performed.

The recovery management unit 17, if it determines that the authentication has been established (YES at step S401), acquires an available information list which is transmitted from a supporter (step S402). The available information list indicates information that can be provided by a supporter.

Then, the recovery management unit 17 determines whether or not the acquired available information list includes all the requested MUST conditions (step S403). If the recovery management unit 17 determines, at step S403, that at least one MUST condition is not included in the list (NO at step S403), or an authentication has not been established at step S401 described above (NO at step S401), the control proceeds to step S404. At step S404, the recovery management unit 17 determines that the response source should not be certified as a supporter, and then terminates the supporter certification process of FIG. 9.

On the other hand, if it its determined that all the MUST conditions requested at step S403 are included in the acquired information available list (YES at step S403), the recovery management unit 17 determines to certify the response source as a supporter (step S405), and then terminates the supporter certification process of FIG. 9. If the response source is determined to be certified as a supporter, a notification is given accordingly to the response source.

Returning to FIG. 3 again, the recovery management unit 17 determines whether or not a supporter has been certified (step S105). If the recovery management unit 17 determines, at step S105, that no supporter has been certified (NO at step S105), the process returns to step S102. In other words, the process covering from steps S102 to S104 is repeatedly performed until a supporter is certified.

On the other hand, if it is determined, at step S105, that a supporter has been certified (YES at step S105), the recovery management unit 17 determines a travel-capable level (step S106). The travel-capable level refers to a control variable, such as a maximum speed or a travel distance, relative to travel. In the present embodiment, the travel-capable condition described above is determined as a travel-capable level.

Figure 10:
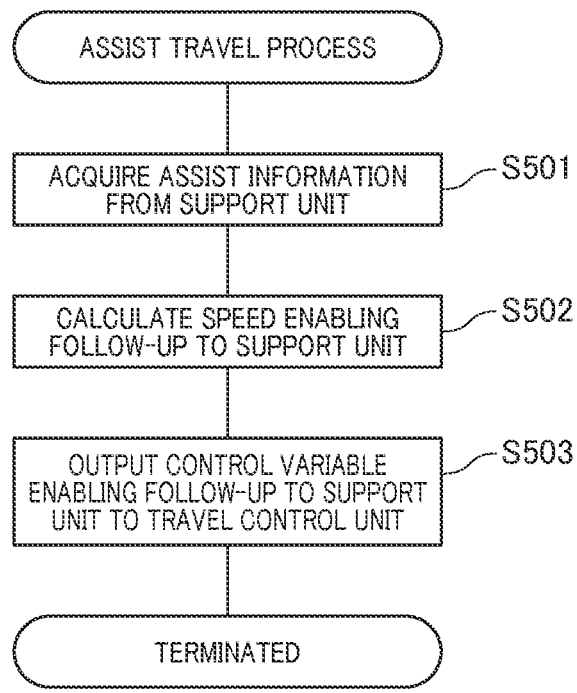
FIG. 10 is a flow diagram illustrating an assist travel process, according to the first embodiment.

Then, the recovery management unit 17 performs an assist travel process (step S107). Referring to FIG. 10, a detailed procedure of the assist travel process is described. The assist travel process is described by way of an example of a situation where a travel-capable area cannot be determined due to a sensor failure that disables detection of surrounding obstructions.

FIG. 10 is a flow diagram illustrating the assist travel process. First, the recovery management unit 17 acquires assist information from a support unit (in this example, position information indicating the absolute position of the support unit) (step S501). Then, based on the travel-capable level determined at step S106, the recovery management unit 17 calculates a speed with which the own vehicle can follow up the support unit (step S502). Then, based on the assist information acquired at step S501 and the follow-up speed calculated at step S502, the recovery management unit 17 calculates a control variable for the own vehicle to travel following up the support unit, and outputs the calculated control variable to the travel control unit 15 (step S503). After that, the recovery management unit 17 terminates the assist travel process of FIG. 10.

Figure 11:
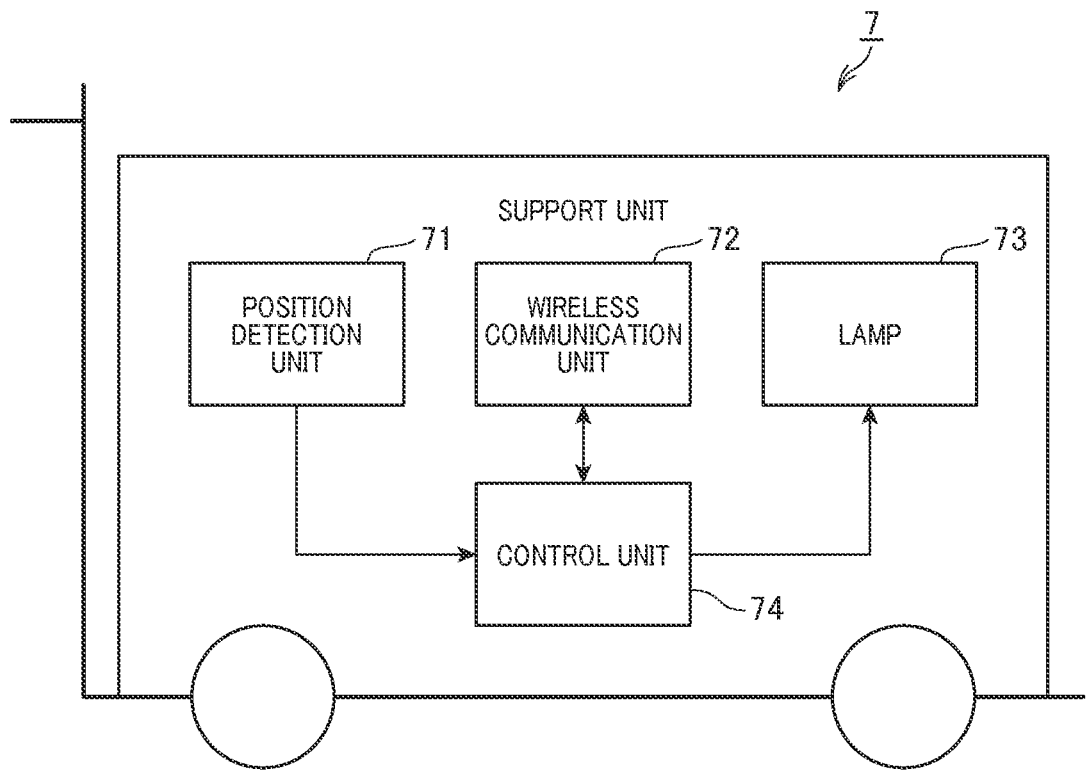
FIG. 11 is a block diagram illustrating a configuration of a support unit, according to the first embodiment.

The support unit herein may be installed in another vehicle, or the support unit may be a human-powered vehicle, such as a carriage. FIG. 11 is a block diagram illustrating a configuration of a support unit 7. As shown in FIG. 11, for example, the support unit 7 is a human-powered vehicle, such as a carriage, and includes a position detection unit 71, a wireless communication unit 72, a lamp 73 and a control unit 74.

The position detection unit 71 includes a position detector, such as GPS, to detect the absolute position of the support unit 7. The wireless communication unit 72 includes, for example, a Wi-Fi communication instrument or a V2X communication instrument to perform wireless communication with a vehicle. The lamp 73 is lit to notify a user of the matter that the support unit 7 has been certified as a supporter. The control unit 74 is configured by an electronic control unit that includes a CPU, a ROM, a RAM and the like.

Figure 12:
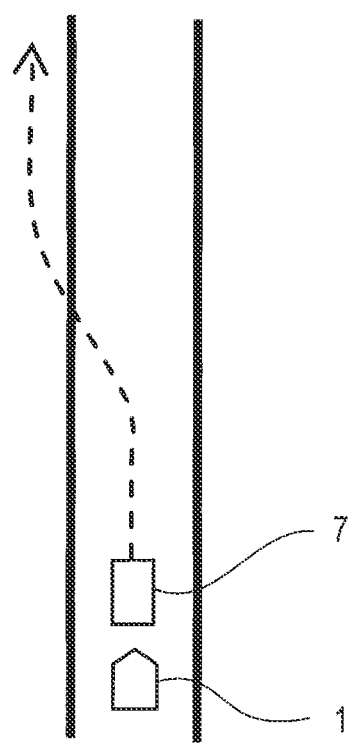
FIG. 12 is a diagram illustrating a guidance method performed by the support unit, according to the first embodiment.

FIG. 12 is a diagram illustrating a guidance method performed by the support unit 7 relative to a vehicle 1 that installs the automated travel system. The support unit 7 is moved along the dashed line indicated in FIG. 12, while keeping transmission of the absolute position of the support unit 7 to the vehicle 1. Thus, the vehicle 1 can travel along the same path as that of the support unit 7 and withdraw to the outside of the lane.

Referring to FIG. 3 again, the recovery management unit 17 determines whether or not an assist has been completed (step S108). If the recovery management unit 17 determines, at step S108, that an assist has not been completed (NO at step S108), the process returns to step S107. In other words, the assist travel process is repeatedly performed until an assist is completed.

On the other hand, if the recovery management unit 17 determines, at step S108, that an assist has been completed (YES at step S108), the recovery process of FIG. 3 is terminated.

Figure 13:
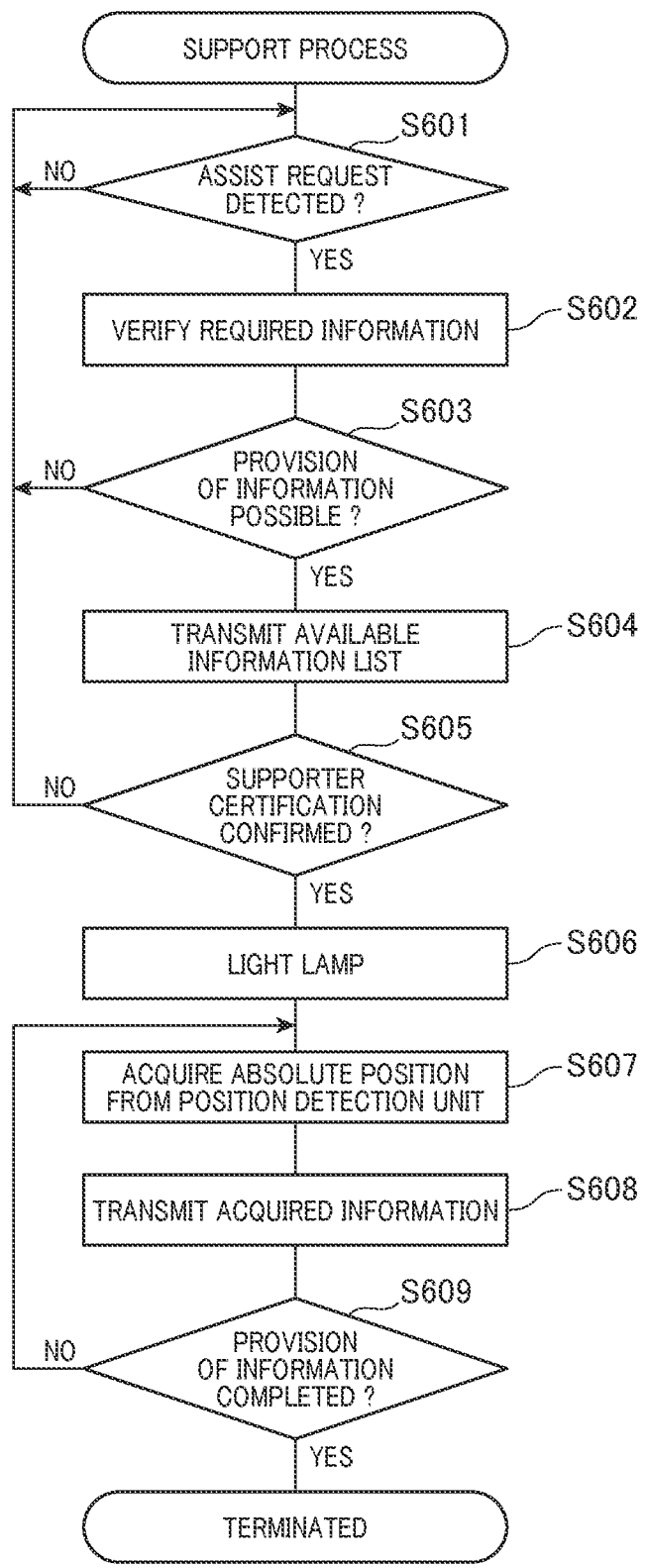
FIG. 13 is a flow diagram illustrating a support process, according to the first embodiment.

Referring to FIG. 13, hereinafter is described a support process performed by the control unit 74 of the support unit 7 illustrated in FIG. 11.

FIG. 13 is a flow diagram illustrating the support process. First, the control unit 74 determines whether or not an assist request has been detected (step S601). The assist request is transmitted at step S302 of the assist request transmission process (FIG. 8) described above.

If the control unit 74 determines that no assist request has been detected (NO at step S601), the process of step S601 is repeatedly performed. If the control unit 74 determines that an assist request has been detected (YES at step S601), the process proceeds to step S602.

At step S602, the control unit 74 verifies required information included in a required information list received as an assist request (step S602) to determine whether or not the information can be provided (step S603). For example, the required information list shown in FIG. 7 includes ten pieces of required information having priority degrees 1 to 10. In this case, if any one of the ten pieces of information can be provided, it is determined that the information can be provided. If the control unit 74 determines, at step S603, that the information cannot be provided (NO at step S603), the process returns to step S601.

On the other hand, if it is determined, at step S603, that the information can be provided (YES at step S603), the control unit 74 transmits an available information list that indicates available information to the transmission source of the assist request (step S604).

Then, the control unit 74 determines whether or not a certification as being a supporter has been confirmed (step S605). If the control unit 74 determines, at step S605, that certification as being a supporter has not been confirmed (NO at step S605), the process returns to step S601. On the other hand, if it is determined, at step S605, that a certification as being a supporter has been confirmed (YES at step S605), the control unit 74 lights the lamp 73 (step S606). When a user finds that the lamp 73 has been lit, the user pushes the support unit 7 to guide the vehicle 1 from ahead of the vehicle 1 and have it withdrawn outside the lane.

Then, the control unit 74 acquires an absolute position from the position detection unit 71 (step S607) and transmits position information indicating the acquired absolute position, as assist information, to the transmission source of the assist request (step S608).

Then, the control unit 74 determines whether or not provision of assist information should be terminated (step S609). The timing of terminating provision of assist information may be determined, for example, by the user, or may be determined depending on conditions, such as time and position.

If the control unit 74 determines, at step S609, that provision of assist information should not be terminated (NO at step S609), the process returns to step S607. In other words, assist information is repeatedly transmitted until provision of assist information is determined to be terminated.

On the other hand, if the control unit 74 determines, at step S609, that provision of assist information should be terminated (YES at step S609), the support process of FIG. 13 is terminated.

[1-3. Advantages]

According to the first embodiment specifically described above, the following advantages can be obtained.

[1A] When the information used for automatic travel control is no longer available due to the occurrence of abnormality, the recovery management unit 17 searches for the support unit 7 which can provide assist information for complementing the missing information that is the information no longer available due to the abnormality (steps S102 to S105). The recovery management unit 17 acquires assist information from the support unit 7 obtained as a result of the search (step S501). Then, the recovery management unit 17 performs a process for performing assist travel control, that is, automatic travel control as a result of complementing the missing information with the assist information (steps S502 to S503).

According to such a configuration, in the event that the information used for automatic travel control is unavailable due to the occurrence of abnormality, the vehicle can be moved under the assist travel control based on the assist information acquired from the support unit 7. Accordingly, compared to the case where automatic travel control is performed based on only the information that can be acquired by the own vehicle, the own vehicle can be safely and easily moved in the occurrence of abnormality that disables automatic travel control.

As a result, the own vehicle that has made an emergency stop can be withdrawn to a safe place, and the vehicle occupants can be saved, and the traffic flow can be restored.

[1B] Compared to the automatic travel control in a normal state, the assist travel control is limited in the controllable range.

Accordingly, compared to a configuration that does not limit the controllable range, the own vehicle, for example, can be safely withdrawn.

[1C] The information used for automatic travel control includes essential information that is essential for the assist travel control (MUST conditions) and additional information that is not essential for the assist travel control (WANT conditions). The recovery management unit 17 searches for the support unit 7 which can provide the assist information for complementing at least the essential information among the missing pieces of information (steps S102 to S105). Then, the recovery management unit 17 differently designates a degree of limitation in the controllable range, according to the presence/absence of the assist information for complementing the additional information among the missing pieces of information (step S106). Thus, the assist travel control can be performed with a degree of limitation conforming to the contents of the assist information (presence/absence of additional information) provided by the support unit 7.

[1D] The recovery management unit 17 differently designates a degree of limitation in the controllable range, according to the accuracy degree of the assist information (step S106). Thus, the assist travel control can be performed with a degree of limitation conforming to the accuracy degree of the assist information provided by the support unit 7.

[1E] The recovery management unit 17 searches for the support unit 7 which can provide the assist information and satisfies predetermined authentication requirements (step S104). Thus, for example, the own vehicle can be prevented from being fraudulently moved based on the assist information provided by, for example, an unspecified person or an unspecified unit.

[1F] The support unit 7 is movable external to the own vehicle. Accordingly, the own vehicle can be moved so as to follow up the support unit 7.

[1G] The support unit 7 includes the position detection unit 71 that detects an absolute position of the support unit 7, and thus provides, as assist information, at least absolute position information indicating the absolute position detected by the position detection unit 71. Accordingly, the own vehicle can be moved so as to approach the support unit 7.

In the first embodiment, the recovery management unit 17 corresponds to an example of the control unit. Steps S102 to S105 correspond to an example of the process performed by the search section, step S501 corresponds to an example of the process performed by the acquisition section, and steps S106, S502 and S503 correspond to an example of the process performed by the processing section. Further, the support unit 7 corresponds to an example of the external unit, and the position detection unit 71 corresponds to an example of the absolute position detection section.

[2. Second Embodiment]

[2-1. Differences from the First Embodiment]

With reference to FIGS. 14 to 20, hereinafter is described an automated travel system according to a second embodiment. The automated travel system of the second embodiment has a hardware configuration similar to that of the automated travel system of the first embodiment, but processes performed are different. The following description is focused on the differences, while the components identical with or similar to those in the first embodiment are given the same reference numerals for the sake of omitting unnecessary description.

[2-2. Processes]

Figure 14:
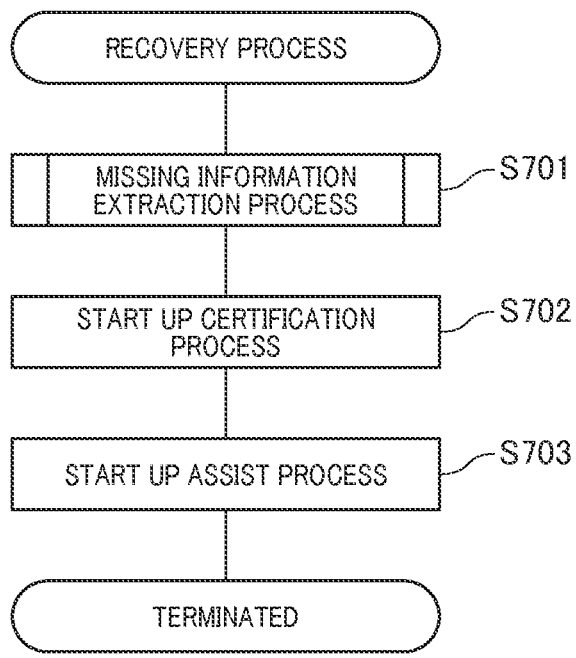
FIG. 14 is a flow diagram illustrating a recovery process, according to a second embodiment.

The recovery management unit 17 of the second embodiment performs a recovery process instead of the recovery process of the first embodiment (FIG. 3). Referring to FIG. 14, the recovery process of the second embodiment is described. FIG. 14 is a flow diagram illustrating the recovery process of the second embodiment. In the recovery process of the second embodiment, step S701 is similar to step S101 in the recovery process of the first embodiment and thus the description is omitted.

Figure 15:
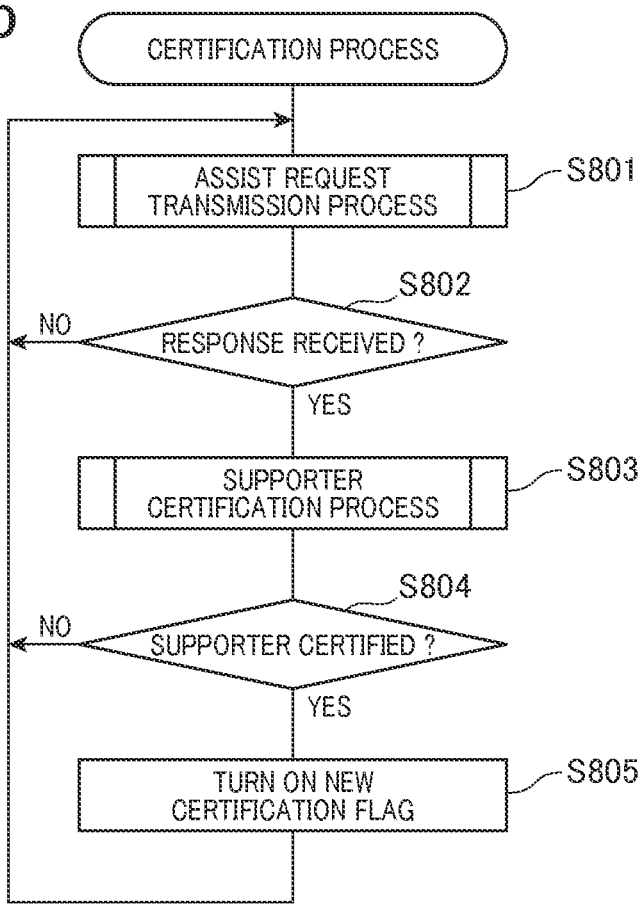
FIG. 15 is a flow diagram illustrating a certification process, according to the second embodiment.

After performing the missing information extraction process at step S701, the recovery management unit 17 starts up a certification process. Referring to FIG. 15, a detailed procedure of the certification process is described. The certification process is performed in parallel with the recovery process shown in FIG. 14.

FIG. 15 is a flow diagram illustrating the certification process. First, the recovery management unit 17 performs an assist request transmission process (FIG. 8) similar to the one in the first embodiment (step S801). The recovery process of the second embodiment is provided in preparation for the change of the required information list. Accordingly, in the assist request transmission process of the second embodiment, when a required information list is changed, the changed required information list is transmitted.

Subsequent to the assist request transmission process, the recovery management unit 17 determines whether or not a response corresponding to a transmitted required information list has been received (step S802). If the recovery management unit 17 determines, at step S802, that no response has been received (NO at step S802), the process returns to step S801. In other words, the assist request transmission process is repeatedly performed until a response is received.

Figure 16:
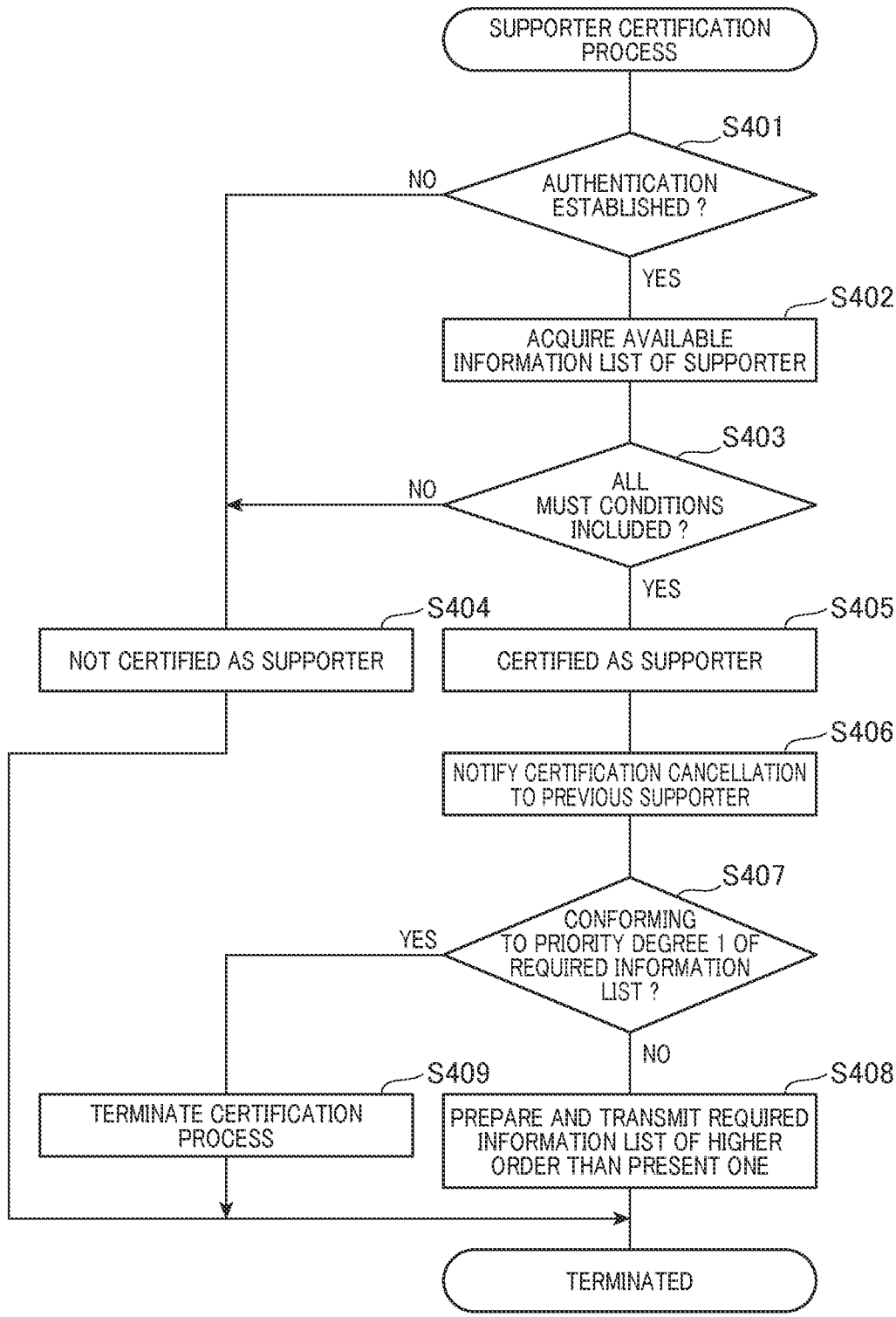
FIG. 16 is a flow diagram illustrating a supporter certification process, according to the second embodiment.

On the other hand, if the recovery management unit 17 determines, at step S802, that a response has been received (YES at step S802), a supporter certification process is performed (step S803). Referring to FIG. 16, a detailed procedure of the supporter certification process of the second embodiment is described. FIG. 16 is a flow diagram illustrating the supporter certification process of the second embodiment. The supporter certification process of the second embodiment includes steps S406 to S409 in addition to the steps of the supporter certification process according to the first embodiment (FIG. 9). Therefore, the description below is focused on step S406 and the subsequent steps, which are the different points.

After determining to certify a response source as a supporter at step S405, the recovery management unit 17 transmits a certification cancellation notification to the supporter certified prior to this determination (step S406). In other words, in the second embodiment, steps S401 to S405 are still performed after certification of a supporter. When a new supporter is certified at step S405, the certification of the previous supporter is cancelled.

Then, the recovery management unit 17 determines whether or not an available information list from the new supporter conforms to priority degree 1 of the required information list (step S407). In other words, it is determined whether or not the information of the highest priority degree in the required information list is available from the new supporter.

If it is determined that the available information list does not conform to priority degree 1 of the required information list (NO at step S407), the recovery management unit 17 prepares a required information list limiting to priority degrees of higher order than those of the presently available information (step S408). In other words, the required information list is changed. After that, the supporter certification process of FIG. 16 is terminated. Accordingly, the available information list obtained after this process will include information with priority degrees of the required information list of higher order than those of the presently available information.

For example, the conditions in the previously prepared required information list are as follows.

MUST condition: Distance to a forward object (accuracy degree of not more than 50 cm) or position of a forward object (accuracy degree of not more than 50 cm)

WANT condition: Lateral distance to the right or left white line (accuracy degree of not more than 5 cm)

If the present supporter can provide a distance to a forward object with an accuracy degree of 5 cm, the following required information list is prepared, for example, and transmitted as a new assist request.

First MUST condition: Distance to a forward object (accuracy degree of not more than 5 cm)

Second MUST condition: Lateral distance to the right or left white line (accuracy degree of not more than 5 cm)

On the other hand, if it is determined that the available information list conforms to priority degree 1 of the required information list (YES at step S407), the recovery management unit 17 terminates the certification process of FIG. 15 (step S409) to terminate the supporter certification process of FIG. 16.

Returning to FIG. 15 again, the recovery management unit 17 determines whether or not any supporter has been certified (step S804). If the recovery management unit 17 determines that no supporter has been certified (NO at step S804), the process returns to step S801. In other words, steps S801 to S803 are repeatedly performed until a supporter is certified.

On the other hand, if it is determined, at step S804, that a supporter has been certified (YES at step S804), the recovery management unit 17 turns on a new certification flag (step S805), and then the process returns to step S801. In this way, the certification process is repeatedly performed before being terminated at step S409 described above.

Figure 17:
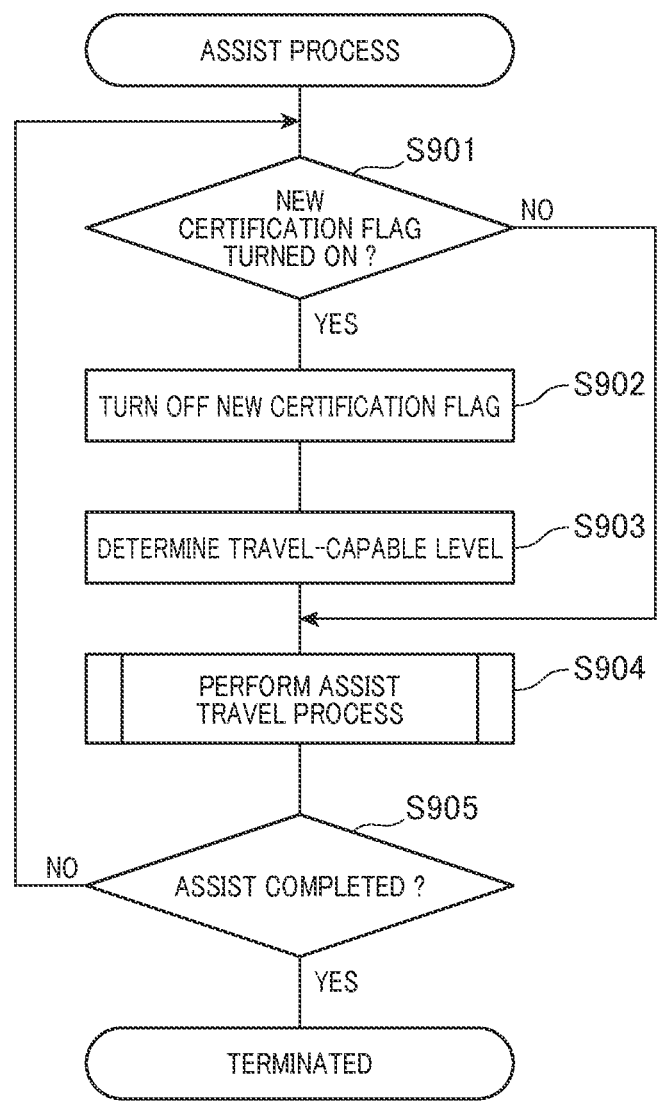
FIG. 17 is a flow diagram illustrating an assist process, according to the second embodiment.

As shown in FIG. 14, after starting up the certification process at step S702, the recovery management unit 17 starts up the assist process (step S703) and then terminates the recovery process of FIG. 14. Referring now to FIG. 17, a detailed procedure of the assist process is described. FIG. 17 is a flow diagram illustrating the assist process. The assist process is performed in parallel with the recovery process of FIG. 14 and the certification process of FIG. 15.

First, the recovery management unit 17 determines whether or not the new certification flag is turned on (step S901). If the new certification flag is determined to be turned on (YES at step S901), the recovery management unit 17 turns off the new certification flag (step S902). Specifically, the new certification flag is cleared. Then, similar to step S106 of the first embodiment, the recovery management unit 17 determines a travel-capable level (step S903).

Then, the recovery management unit 17 performs an assist travel process (FIG. 10) similar to the one in the first embodiment (step S904). In a state where an initial supporter is not yet to be certified, the assist travel process is skipped.

Then, the recovery management unit 17 determines whether or not an assist has been completed (step S905). If the recovery management unit 17 determines, at step S905, that an assist has not yet been completed (NO at step S905), the process returns to step S901. In other words, the assist travel process is repeatedly performed until an assist is completed.

On the other hand, if the recovery management unit 17 determines, at step S905, that an assist has been completed (YES at step S905), the assist process of FIG. 17 is terminated.

Figure 18:
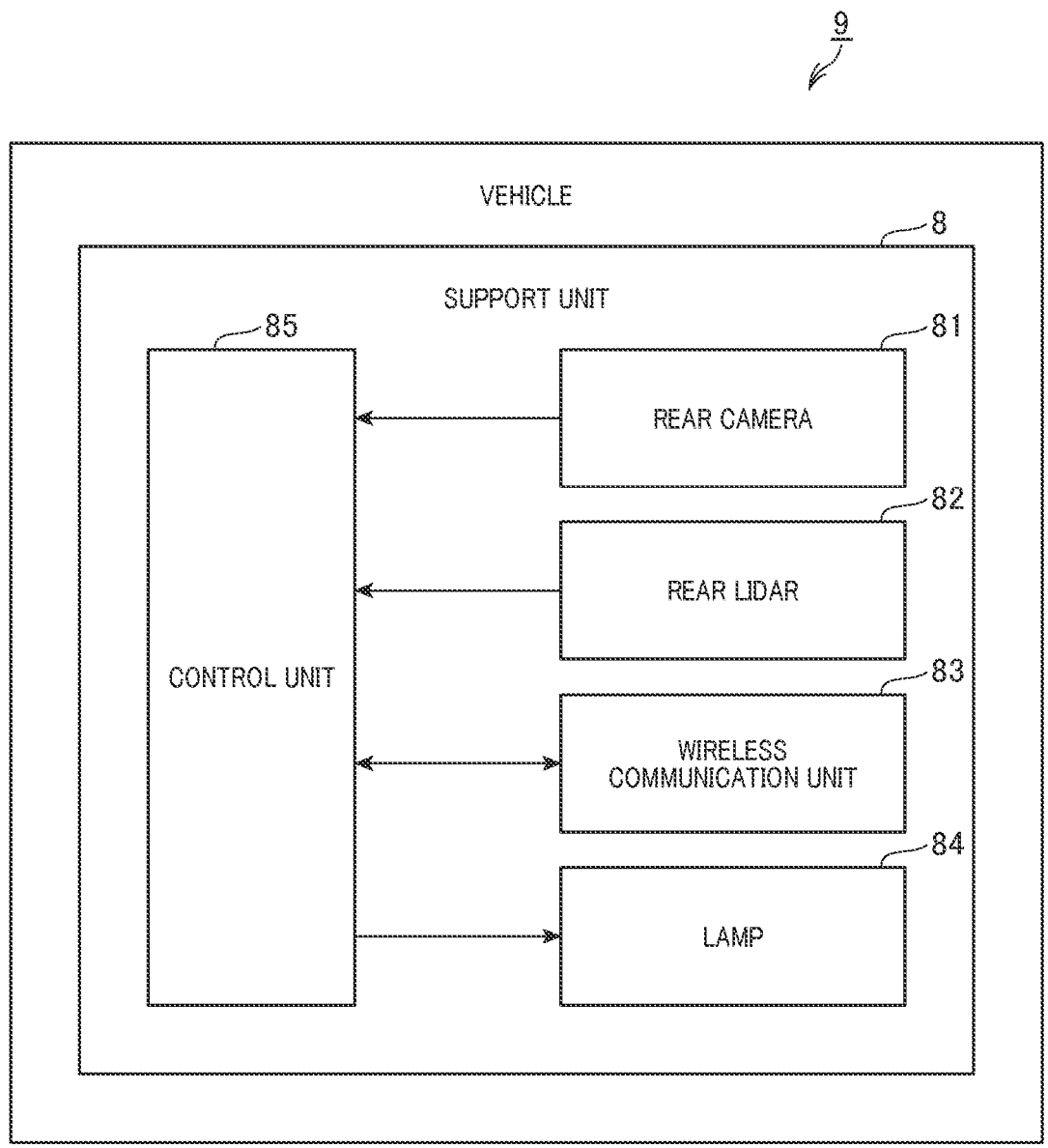
FIG. 18 is a block diagram illustrating a configuration of a support unit, according to the second embodiment.

Similar to the first embodiment, the support unit may be a human-powered one, or the support unit may be installed in another vehicle as described below. FIG. 18 is a block diagram illustrating a configuration of a support unit 8 according to the second embodiment.

Specifically, the support unit 8, which is installed in a vehicle 9, includes a rear camera 81, a rear LIDAR (light detection and ranging) 82, a wireless communication unit 83, a lamp 84 and a control unit 85.

The rear camera 81 picks up an image behind the vehicle 9 in which the support unit 8 is installed. The rear LIDAR 82 (relative position detection section) radiates electromagnetic waves (e.g., light waves), whose wavelength is comparatively short, in the rearward direction of the vehicle 9. The rear LIDAR 82 receives reflected waves, which are the reflection of the radiated electromagnetic waves, to detect a distance to an object and an azimuth in which the object is present. The rear LIDAR 82 is able to measure a distance to a forward object relative to a vehicle that is present behind the vehicle 9 with an accuracy degree of 5 cm. The wireless communication unit 83 includes, for example, a Wi-Fi communication instrument or a V2X communication instrument to perform wireless communication with a vehicle other than the vehicle 9. The lamp 84 is lit to notify a user of the matter that the support unit 9 has been certified as a supporter. The control unit 85 is configured by an electronic control unit that includes a CPU, a ROM, a RAM and the like.

Figure 19:
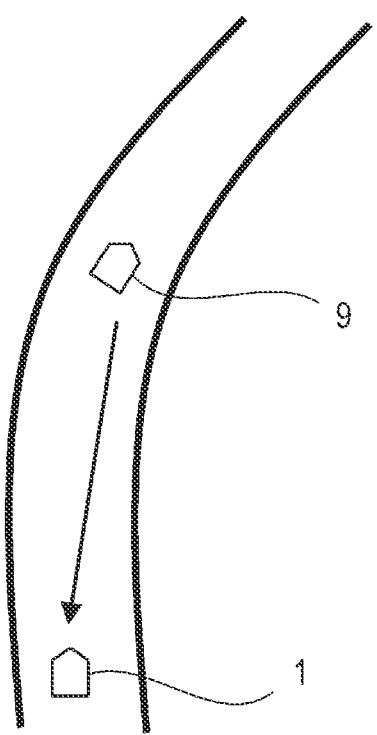
FIG. 19 is a diagram illustrating a guidance method performed by the support unit, according to the second embodiment.

FIG. 19 is a diagram illustrating a guidance method performed by the support unit 8 for a vehicle 1 that installs the automated travel system. As shown in FIG. 19, the vehicle 9 provided with the support unit 8 moves to guide the vehicle 1, while keeping transmission of the position of a forward object relative to the vehicle 1. Thus, the vehicle 1 can be guided and moved by the support unit 8.

The information provided by the support unit 8 is of priority degree 6 of the required information list (FIG. 7). A support unit that can provide information of higher priority degrees can raise the travel-capable level higher. For example, the rear LIDAR 82 is able to measure a distance from the vehicle 1 to a forward object with an accuracy level of 5 cm, and is also able to measure a lateral distance to the right or left white line in respect of the vehicle 1. In other words, this support unit is able to provide information of priority degree 1 of the required information list (FIG. 7). In this case, the vehicle 1 can be moved and guided by the support unit 8, but at the same time can perform a lane-keeping process (lane departure avoidance process). Accordingly, the travel-capable level is raised by changing the support unit 8 to the one which is able to provide information of higher priority degrees.

Figure 20:
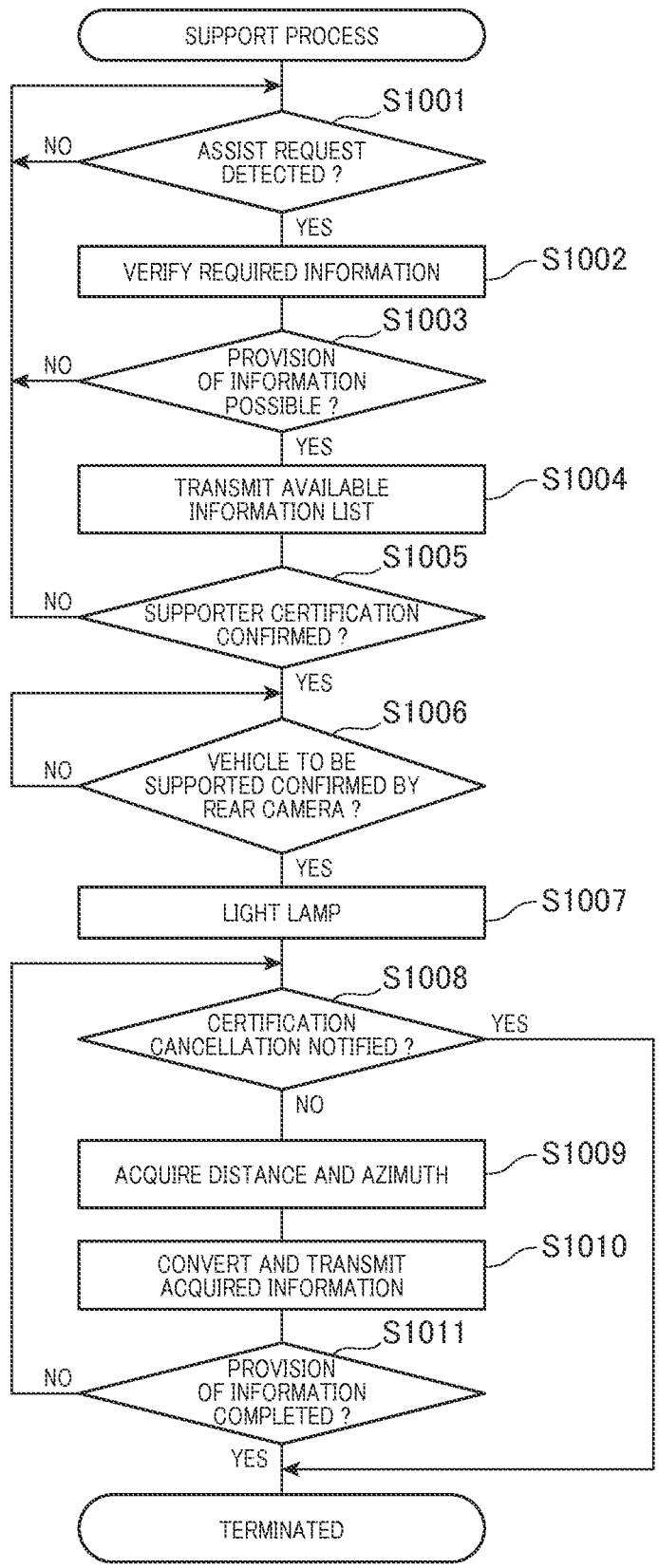
FIG. 20 is a flow diagram illustrating a support process, according to the second embodiment.

Referring to FIG. 20, hereinafter is described a support process performed by the control unit 85 of the support unit 8 shown in FIG. 18. FIG. 20 is a flow diagram illustrating the support process. In FIG. 20, steps S1001 to S1005 are similar to steps S601 to S605, respectively, of the support process (FIG. 13) according to the first embodiment. Therefore, the description is omitted.

If it is determined, at step S1005, that a certification as being a supporter has been confirmed (YES at step S1005), the control unit 85 confirms the vehicle 1 which is to be supported (transmission source of an assist request), using the rear camera 81 (step S1006). If confirmation is made (YES at step S1006), the control proceeds to step S1007.

At step S1007, the control unit 85 lights the lamp 84. When a user finds that the lamp 84 has been lit, the vehicle 9 is permitted to travel in such a way that the vehicle 1 is guided to a destination (e.g., to a place outside of the lane or a maintenance shop).

Then, the control unit 85 determines whether or not a certification cancellation notification for cancelling the certification of the supporter has been received (step S1008). The certification cancellation notification is transmitted at step S406 of the supporter certification process (FIG. 16) described above. If the control unit 85 determines that the certification cancellation notification has been received (YES at step S1008), the support process of FIG. 20 is terminated.

On the other hand, if it is determined that a certification cancellation notification has not yet been received (NO at step S1008), the control unit 85 acquires from the rear LIDAR 82 a distance to and an azimuth of a rearward object (step S1009). The control unit 85 converts the acquired distance and azimuth to a distance and azimuth in terms of the case where the vehicle 9 is viewed from the vehicle 1 which is to be supported. The converted distance and azimuth are transmitted, as assist information, to the transmission source of the assist request (step S1010).

Then, the control unit 85 determines whether or not provision of assist information should be terminated (step S1011). The timing of terminating provision of assist information may, for example, be ensured to be determined by a user, or may be ensured to be determined depending on conditions, such as time and position.

If the control unit 85 determines, at step S1011, that provision of assist information should not be terminated (NO at step S1011), the process returns to step S1008. On the other hand, if the control unit 85 determines that provision of assist information should be terminated (YES at step S1011), the support process of FIG. 20 is terminated.

[203. Advantages]

According to the second embodiment specifically described above, the following advantages are obtained in addition to the advantages [1A] to [1F] of the first embodiment described above.

[2A] The recovery management unit 17 continues search after the search of a support unit 8 (which is referred to herein as "first support unit 8") that can provide assist information (which is referred to as "first assist information") (step S801). Then, after the first support unit 8 is found, if a second support unit 8 is found which can provide second assist information which more mitigates the limitation of the controllable range than the first assist information does, the recovery management unit 17 performs a process for performing assist travel control, using the second assist information instead of the first assist information (steps S502, S503 and S903). Accordingly, compared to the case where a support unit is not changed, limitation of the assist travel control can be mitigated.

[2B] The support unit 8 includes the rear LIDAR 82 that detects a position of the support unit 8 relative to the own vehicle to provide relative position information, as assist information, which at least indicates the relative position detected by the rear LIDAR 82. Accordingly, the own vehicle can be moved so as to approach the support unit 8.

In the second embodiment, steps S801 to S805 correspond to an example of the process performed by the search section, steps S502, S503 and S903 correspond to an example of the process performed by the processing section, the support unit 8 corresponds to an example of the external unit, and the rear LIDAR 82 corresponds to an example of the relative position detection section.

[3. Other Embodiments]

Some embodiments of the present invention have so far been described. However, as a matter of course, the present invention should not be construed as being limited to these embodiments.

[3A] The foregoing embodiments are configured to limit the controllable range of assist travel control, compared to the automatic travel control in a normal state. However, the present invention should not be construed as being limited to this. For example, assist travel control equivalent to the automatic travel control in a normal state may be ensured to be performed.

[3B] The function possessed by a single component in the foregoing embodiments may be separated into functions performed by a plurality of components, or the functions possessed by a plurality of components may be integrated into a function performed by a single component. Further, at least a part of the configuration of each of the foregoing embodiments may be replaced by a well-known configuration having an equivalent function. Also, a part of the configuration of each of the foregoing embodiments may be omitted as far as the technical problem is solved. In addition, at least a part of the configuration of a foregoing embodiment may be, for example, added to or replaced by the configuration of another foregoing embodiment.

[3C] Besides the recovery management unit 17 described above, the present invention can be realized in various modes, such as an automated travel system including the recovery management unit 17 as a component, a program that allows a computer to function as the recovery management unit 17, a medium storing the program, and a recovery method based on the program.

Hereinafter, aspects of the above-described embodiments will be summarized.

As an aspect of the embodiment, a control apparatus (17) is used in a vehicle (1) that performs automatic travel control. The apparatus includes: a search section (S102 to S105, S801 to S805) which searches for an external unit (7, 8), when information used for the automatic travel control is no longer available due to abnormality, the external unit providing assist information for complementing missing information that is the information no longer available due to the abnormality; an acquisition section (S501) which acquires the assist information from the external unit obtained as a result of the search of the search section (step S501); and a processing section (S106, S502 to S503, S903) which performs a process for performing assist travel control, which is the automatic travel control as a result of complementing the missing information with the assist information.

According to the configuration, in the event that the information used for automatic travel control is no longer available due to the occurrence of abnormality, the vehicle can be moved under assist travel control which is based on the assist information acquired from an external unit. Thus, the vehicle can be safely and easily moved in the occurrence of abnormality that disables the automatic travel control, compared to the case where automatic travel control is performed on the basis of only the information that is available within the vehicle.

What is claimed is:

1. A control apparatus which is used in a vehicle that performs automatic travel control, the apparatus comprising:
   a search section, using a computer, which searches for an external unit, when information used for the automatic travel control is no longer available due to abnormality, the external unit providing assist information for complementing missing information that is the information no longer available due to the abnormality;
   an acquisition section, using the computer, which acquires the assist information from the external unit obtained as a result of the search of the search section; and
   a processing section, using the computer, which performs a process for performing assist travel control, which is the automatic travel control as a result of complementing the missing information with the assist information.

2. The control apparatus according to claim 1, wherein the assist travel control is limited in a controllable range, compared to the automatic travel control in a normal state.

3. The control apparatus according to claim 2, wherein the search section continues search after the search of the external unit, which is a first external unit and provides the assist information, which is first assist information, and
   after the search section finds the first external unit, if a second external unit is found which provides second assist information which more mitigates limitation of the controllable range than the first assist information does, the processing section performs a process for performing the assist travel control, using the second assist information instead of the first assist information.

4. The control apparatus according to claim 2, wherein the information used for the automatic travel control includes essential information that is essential for the assist travel control and additional information that is not essential for the assist travel control,
   the search section searches for the external unit which provides the assist information for complementing at least the essential information among the missing information, and
   the processing section differently designates a degree of limitation in the controllable range, according to presence/absence of the assist information for complementing the additional information among the missing information.

5. The control apparatus according to claim 2, wherein the processing section differently designates a degree of limitation in the controllable range, according to an accuracy degree of the assist information.

6. The control apparatus according to claim 1, wherein the search section searches for the external unit which provides the assist information and satisfies a predetermined authentication requirement.

7. The control apparatus according to claim 1, wherein the external unit is movable external to the vehicle.

8. The control apparatus according to claim 7, wherein the external unit includes a position detection section that detects an absolute position of the external unit, and provides, as the assist information, at least absolute position information indicating an absolute position detected by the position detection unit.

9. The control apparatus according to claim 7, wherein the external unit includes a relative position detection section that detects a position of the external unit relative to the vehicle to provide relative position information, as the assist information, which at least indicates a relative position detected by the relative position detection section.

10. A method for performing automatic travel control of a vehicle, the method comprising:
searching for an external unit, when information used for performing automatic travel control is no longer available due to abnormality, the external unit providing assist information for complementing missing information that is the information no longer available due to the abnormality;
acquiring the assist information from the external unit obtained as a result of the searching for the external unit; and
performing a process for performing assist travel control, which is the automatic travel control as a result of complementing the missing information with the assist information.

11. The method according to claim 10, wherein the assist travel control is limited in a controllable range, compared to the automatic travel control in a normal state.

12. The method according to claim 11, wherein the searching for the external unit further comprises continuing search after the search of the external unit, which is a first external unit and provides the assist information, which is first assist information, and
after finding the first external unit, if a second external unit is found which provides second assist information which more mitigates limitation of the controllable range than the first assist information does, the performing of the process includes performing a process for performing the assist travel control, using the second assist information instead of the first assist information.

13. The method according to claim 11, wherein the information used for performing the automatic travel control includes essential information that is essential for the assist travel control and additional information that is not essential for the assist travel control,
the searching for the external unit further comprises searching for the external unit which provides the assist information for complementing at least the essential information among the missing information, and
the performing of the process for performing assist travel control further comprises differently designating a degree of limitation in the controllable range, according to presence/absence of the assist information for complementing the additional information among the missing information.

14. The method according to claim 11, wherein the performing of the process for performing assist travel control further comprises differently designating a degree of limitation in the controllable range, according to an accuracy degree of the assist information.

15. The method according to claim 10, wherein the searching for the external unit further comprises providing the assist information and satisfying a predetermined authentication requirement.

16. A system for performing automatic travel control of a vehicle, the system comprising:
a computer;
a computer-readable storage medium; and
a set of computer-executable instructions stored on the computer-readable storage medium that cause the computer to implement:
searching for an external unit, when information used for performing automatic travel control is no longer available due to abnormality, the external unit providing assist information for complementing missing information that is the information no longer available due to the abnormality;
acquiring the assist information from the external unit obtained as a result of the searching for the external unit; and
performing a process for performing assist travel control, which is the automatic travel control as a result of complementing the missing information with the assist information.

17. The system according to claim 16, wherein the assist travel control is limited in a controllable range, compared to the automatic travel control in a normal state.

18. The system according to claim 16, wherein the external unit is movable external to the vehicle.

19. The system according to claim 18, wherein the external unit includes a position detection section that detects an absolute position of the external unit, and provides, as the assist information, at least absolute position information indicating an absolute position detected by the position detection unit.

20. The system according to claim 18, wherein the external unit includes a relative position detection section that detects a position of the external unit relative to the vehicle to provide relative position information, as the assist information, which at least indicates a relative position detected by the relative position detection section.

* * * * *